United States Patent [19]

Altman et al.

[11] 4,035,691
[45] July 12, 1977

[54] PULSED LASER EXCITATION SOURCE

[75] Inventors: Daniel E. Altman; Glidden J. Barstow; Myer Geller, all of San Diego, Calif.

[73] Assignee: The United States of America as represented by the Secretary of the Navy, Washington, D.C.

[21] Appl. No.: 601,760

[22] Filed: Aug. 4, 1975

[51] Int. Cl.$^2$ ........................................ H05B 41/30
[52] U.S. Cl. .............................. 315/246; 313/225; 315/358; 331/94.5 P
[58] Field of Search .......... 315/358, 112, 117, 118, 315/160, 162, 246; 313/184, 225, 214; 331/94.5 P

[56] References Cited

U.S. PATENT DOCUMENTS

| | | | |
|---|---|---|---|
| 2,182,779 | 12/1939 | Alterthum et al. | 315/358 |
| 3,293,493 | 12/1966 | Johnson et al. | 315/358 |
| 3,311,775 | 3/1967 | Solow | 315/358 |
| 3,679,998 | 7/1972 | Dahlinger | 315/57 |
| 3,786,297 | 1/1974 | Zollweg et al. | 313/184 |
| 3,898,504 | 8/1975 | Akutsu et al. | 313/184 |
| 3,909,736 | 9/1975 | Huchital et al. | 331/94.5 P |
| 3,914,648 | 10/1975 | Friedman et al. | 331/94.5 P |

*Primary Examiner*—Eugene R. La Roche
*Attorney, Agent, or Firm*—R. S. Sciascia; G. J. Rubens; J. W. McLaren

[57] ABSTRACT

A high intensity source produces light energy output principally in the 3600A to 4300A spectral region. An envelope of material substantially transparent to light energy within the desired spectral region is sealed to contain xenon gas in an amount sufficient to produce at least one atmosphere of pressure in its unheated state and also mercury in an amount sufficient to develop a vapor pressure of not less than one atmosphere when the envelope is heated to an operative temperature. Electrically conductive electrodes communicate with the interior of the sealed envelope forming a gap therebetween which becomes a conductive arc upon connection of external terminals of the electrodes to a source of pulsed electrical power. The sealed envelope and its contents are maintained at an operative temperature of the order of not less than approximately 500° C, ensuring the vapor pressures required to produce the high intensity output within the desired spectral region.

3 Claims, 6 Drawing Figures

PULSED LASER EXCITATION SOURCE

BACKGROUND OF THE INVENTION

Many underwater optical system for communications, gated viewing, surveillance, and bottom mapping require efficient high peak power pulsed transmitters in the blue-green spectral region (i.e. 4600A to 5100A). This requirement is dictated by the physical fact that transmittance of power in ocean waters is most efficient when the source of optical power emits within the aforementioned spectral region, known as the "ocean window". In other words, minimum attenuation and maximum efficiency can be attained by employing light energy sources which emit principally within the spectral range of the so-called ocean window.

For example, pulsed lasers in the form of frequency doubled neodymium systems emitting principally at the 5300A spectral region have been used relatively commonly as a source of optical energy for underwater systems. Unfortunately, however, the attenuation coefficient for optical energy at the 5300A wavelength is approximately twice as large as the minimum value for deep ocean waters which can be realized within the ocean window spectral range of 4600A to 5100A.

More recently, pulsed dye lasers have been under development for use as a source of optical energy in underwater optical systems. One most important aspect of the performance of selected dye lasers in their capability of being tunable to provide a principal portion of their emitted output of optical energy at wavelengths within the blue-green ocean window spectral region of 4600A to 5100A where the attenuation in ocean waters is at its minimum value.

In the employment of such dye lasers in underwater optical systems, to avail more fully of their advantageous use one of the limitations which must be overcome is the inefficient transfer of energy from prior art, currently available flash lamp excitation sources to the absorption spectral region of the dye laser material. Current and prior state of the art dye laser flash lamp excitation sources include lamps filled with xenon gas to provide a pulsed emission of a quasi-continuous nature resembling that of a black body. Unfortunately, however, the emitted optical energy of such xenon lamps is a poor match with the absorption spectral region of many dye lasers materials; that is, the principal peak energy outputs of such xenon lamp dye laser excitation sources occurred in regions outside the absorption spectral band between 3600A and 4300A.

The use of many other inert gases in addition to xenon have been explored as a potential flash lamp dye excitation sources but unfortunately none is presently known to provide any truly significant improvement over the prior art xenon flash lamps in terms of producing a principal amount of peak light energy output within the absorption spectral region of many dye laser materials and as defined hereinbefore.

Accordingly, it is highly desirable that an improved flash lamp for dye laser excitation be devised and that the radiation from such improved flash lamps include at least the three following characteristics:

1. Enhanced emission must occur principally within the desired wavelength spectral region.
2. The emission must be greater than that from prior art flash lamps excited under similar conditions.
3. The peak emitted power must be sufficiently large to have practical utility in the excitation of dye laser materials in practical optical systems.

SUMMARY OF THE INVENTION

The present invention is directed to a high intensity pulsed light source which produces its principal light energy output substantially within the 3600A to 4300A spectral region to match the absorption spectral region of many dye laser materials, which are in turn, useful in producing laser energy outputs in the spectral region that has come to be known as the ocean window, i.e., the blue-green spectral region, more specifically from 4600A to 5100A.

The present invention contemplates a sealed envelope of suitable material, such as quartz, which is substantially transparent to light energy within the spectral emission region of 3600A to 4300A. Electrically conductive electrodes communicating with the interior of the envelope are sealed to the structure to form a gap between the two electrodes. External terminals of the electrically conductive electrodes extend to the outside of the structure for connection to a suitable power source.

Before the envelope is sealed, xenon gas is introduced into it in amounts sufficient to produce at least one atmosphere of pressure in its uheated, non-operational state.

Additionally, an amount of mercury is introduced into the interior of the envelope sufficient to develop a vapor pressure of not less than one atmosphere when the envelope is heated to its operative temperature.

A source of pulsed electrical power is connected to the external terminals of the electrically conductive electrodes sealed in the envelope; the envelope and its contents are maintained at an operative temperature of the order of not less than 500° C to develop and sustain the internal vapor pressures which produce the high intensity peak outputs within the desired spectral region.

Ideally the gap between the electrically conductive electrodes of the light source is of a dimension which substantially matches the principal dimension of the dye laser material to enhance coupling of light energy.

One of the more desirable advantages of the concept of the present invention results from its being operative in a pulsed mode which provides for significantly higher peak power outputs as contrasted to a continuous wave mode of operation. Within the concept of the present invention, desirably the duration of the pulses employed to actuate the excitation lamp is extremely short relative to the cyclic repetition periods of the pulses to produce an extremely low duty cycle enhancing the capability of high peak power output.

Accordingly, it is a primary object of the present invention to provide a high intensity light source producing its principal light energy output substantially matched to the absorption spectral region of many dye laser materials.

An equally important primary object of the present invention is to provide such high intensity light in a pulsed form affording significantly higher peak powers than may be readily attained in continuous wave form.

A further object of the present invention is to provide such a high intensity pulsed light source in which the electrically conductive electrodes of the lamp assembly has a gap therebetween of a dimension substantially matched to the principal dimension of a dye laser material which it excites by optical coupling.

Another important object of the present invention is to provide such high intensity pulsed light source having a fill of xenon gas and mercury sealed within it in amounts which generate optimum relative vapor pressures at operative temperatures for producing maximum light intensity within the 3600A to 4300A spectral region.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
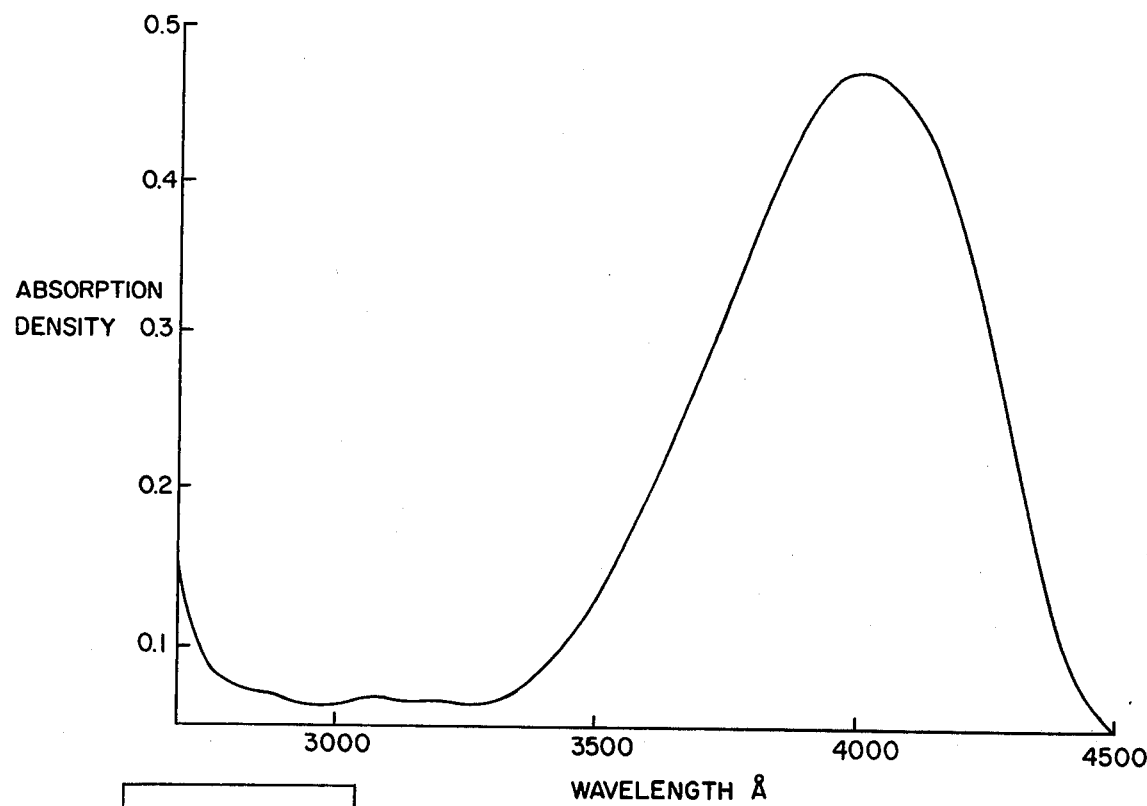
FIG. 1 is a graphic representation of the absorption characteristics of a typical dye laser material which emits in the bluegreen region.

FIG. 1 is a graphical illustration of the absorption spectrum of a dye laser of the coumarin type which exhibits highly desirable emission characteristics within the spectral region of the blue-green ocean window. The particular dye whose absorption characteristic is shown in FIG. 1 has been designated as "7DEA-4TFMC in 1, 2, dichloroethane". In order for that dye laser to generate laser emission in the blue-green region it must be raised to a sufficient excitation level by absorbing optical energy. As the absorption characteristic of FIG. 1 illustrates, such optical energy may be most effectively and efficiently absorbed generally within the 3600A to 4300A spectral region.

Accordingly, the high intensity light source of the present invention provides highly advantageous operative characteristics since a principal portion of its light energy output is substantially within the 3600A to 4300A spectral region which is matched with the general area of maximum absorption of many dye laser materials such as the coumarin dyes, for example.

Moreover, the present invention inherently is conceived to be a pulsed high intensity light source having a relatively very low duty cycle which, in turn, makes extremely high peak power outputs possible which is a most desirable operative advantage.

Figure 2:
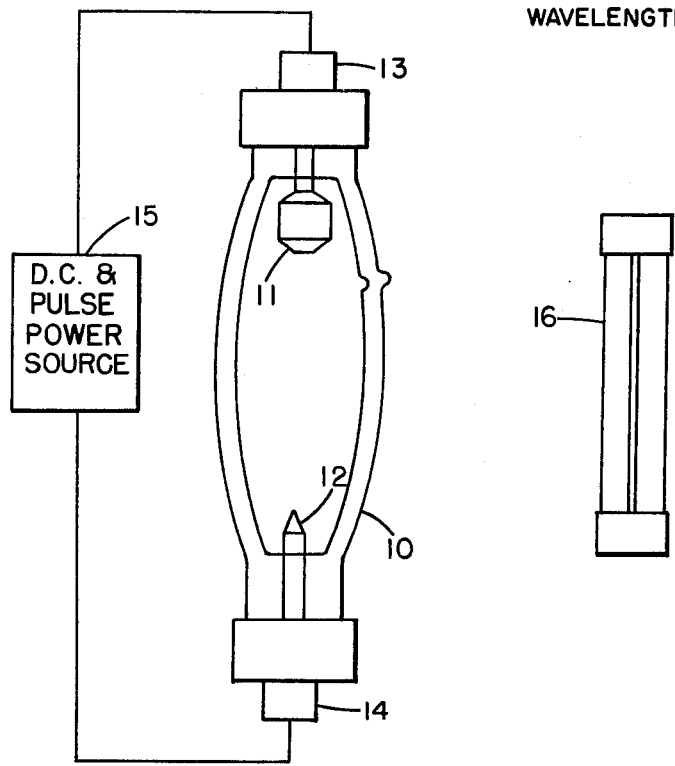
FIG. 2 is a schematic representation of an embodiment of the present invention.

FIG. 2 illustrates an embodiment of the present invention shown with a liquid dye laser cell assembly of the type which may be energized and raised to a laser excitation level by absorption of light energy output from the high intensity light source of the present invention.

In FIG. 2, the light source of the present invention includes a sealed envelope 10 made of material substantially transparent to thelight energy within the spectral region where most efficient transfer of light energy may be achieved relative to the absorbing medium, such as a liquid dye laser material, for example. Two electrically conductive electrodes, 11 and 12, are sealed within the envelope 10 communicating with its interior and forming a gap therebetween.

The electrically conductive electrodes 11 and 12 have external terminals, 13 and 14, respectively, adapted to be connected to a suitable source of electrical power. A pulse power source 15 is connected across the external terminals 13 and 14 of the electrically conductive electrodes 11 and 12.

Before its being sealed, xenon gas is introduced into the envelope 10 in an amount sufficient to produce at least one atmosphere of pressure in its unheated, nonoperative state. Additionally, an amount of mercury is introduced into the envelope 10 before its being sealed in an amount which is sufficient to develop a vapor pressure of not less than one atmosphere upon the envelope being heated to its operative temperature.

The concept of the present invention requires that the amplitude of current flow between the electrodes be sufficient to maintain the envelope and its contents at an operative temperature of the order of not less than 500° C, developing xenon and mercury vapor pressures which enable the assembly to produce a desired principal amount of light energy output substantially within the 3600A to 4300A spectral region. In typical operation the light energy output of the light source of the present invention is optically coupled to a dye laser cell assembly 16 for absorption and resultant excitation to a lasing level.

Figure 3:
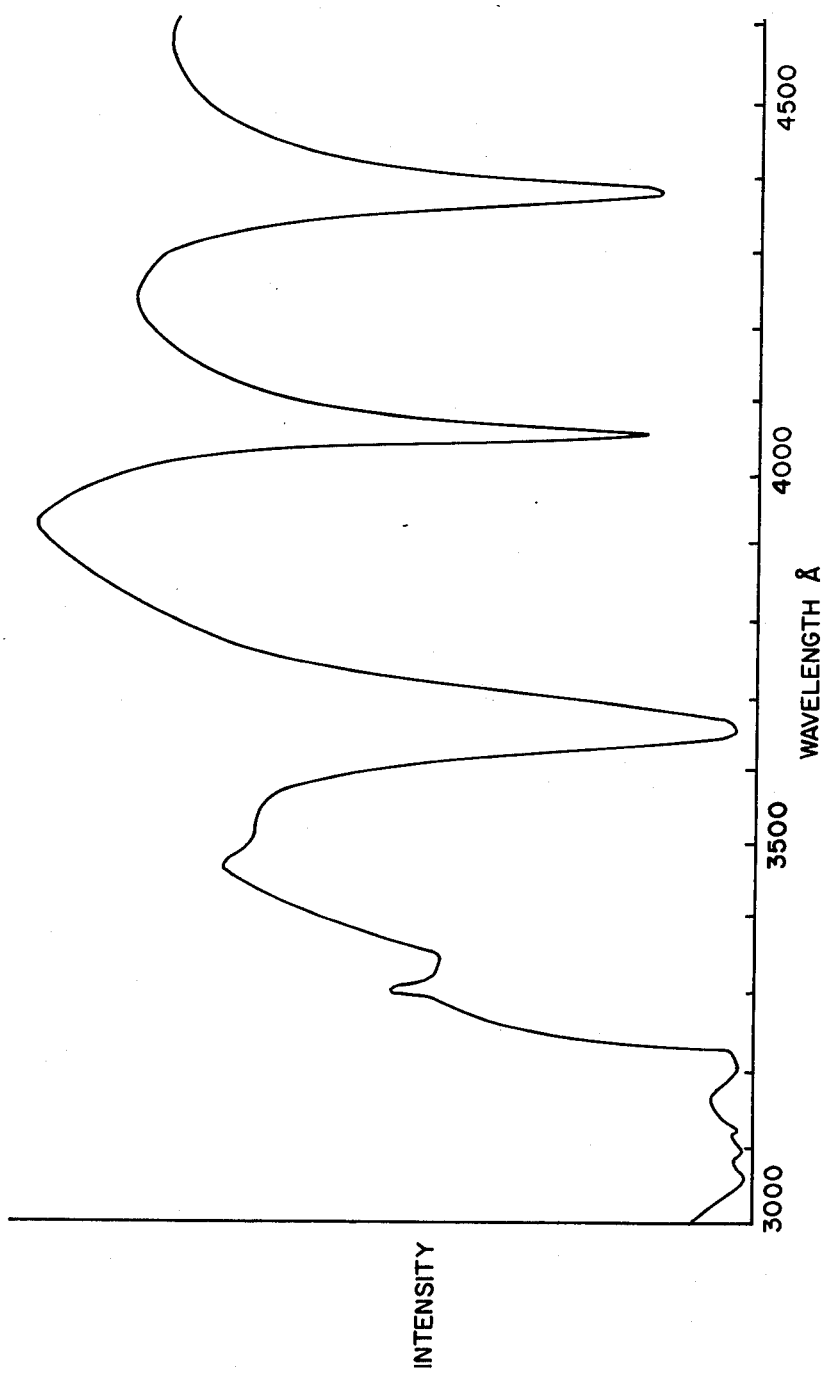
FIG. 3 is a graphical representation of the spectral distribution of peak intensities during the time of peak current flow in operation of an embodiment of the present invention.

FIG. 3 graphically depicts the intensity of peak output of optical energy relative to wavelength in terms of angstrom units produced during the time of peak current flow in the operation of an embodiment of the present invention such as that illustrated in FIG. 2. It will be seen from FIG. 3 that the output characteristics of peak light energy of the lamp of the present invention are very desirably and closely matched to the absorption characteristics of a blue-green coumarin dye laser material as illustrated in FIG. 1.

In accordance with the concept of the present invention, it is most important that the lamp assembly be operated at an elevated temperature in order to generate the vapor pressures of both the xenon gas and the mercury vapor within the sealed envelope to a level which will produce the desired output results within the spectral region desired. It has been found that the high intensity light source of the present invention must therefore be operated principally at a temperature of the order of not less than 500° C.

In the particular lamp assembly illustrated in FIG. 2, whose output characteristics are illustrated in FIG. 3, typical operative temperatures producing the desired results in accordance with the concept of the present invention were achieved at temperatures maintained in the 500° C –650° C range. The concept of the present invention is not restricted nor limited to that specific temperature range, however, since the amounts of xenon gas and metallic mercury which are contained within the sealed envelope are at least partially determinative of the temperature which must be employed to develop the respective vapor pressures required to produce the unique and highly desirable results in terms of a principal light energy output substantially within the 3600A to 4300A spectral region.

Figure 4:
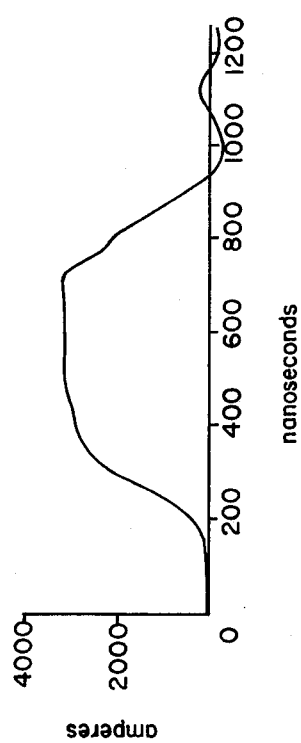
FIG. 4 is a graphical representation of the amplitude and duration of electrical pulses through the pulsed light source of the present invention.

One embodiment of the high intensity light source of the present invention of the type illustrated in FIG. 2 was operated by a pulse forming line energized from a suitable pulse power source. The pulse length was approximately 750 nanoseconds in duration and the pulse repetition rate was 30 pulses per second. FIG. 4 is a graphical illustration of current flow through the high intensity light source of FIG. 2 depicting amplitude of current vs. duration of the pulsed arc in actual operation, originally photographically recorded through the use of oscillographic apparatus connected with the operative combination.

In one particular embodiment of the present invention it was found desirable to maintain a dc simmer current through the light source of the order of 15 to 25 amperes to facilitate the breakdown of the xenon gas and thus insure pulsed arcing in virtually instantaneous response to the pulse power source. Accordingly, in a preferred embodiment of the present invention the pulse power source 15 may include a suitable dc source of power as well, to expedite and facilitate the breakdown of the xenon gas as desired.

As is shown in FIG. 4, the duration of the current pulse through the light source is of the order of approximately 750 nanoseconds or three-quarters of a microsecond. In order for the light source of the present invention to be an effective dye laser pump source of excitation, the turn-on time of the light source must be less than one microsecond.

This requirement is necessitated by the operative characteristics of dye laser materials, such as the coumarins and others, which develop triplet-triplet concentrations in amounts that can impede and prevent laser action when rate of rise of the excitation pulses is not fast enough.

It also should be noted that the pulse rise time of current flow within the light source of the present invention as exemplified by the embodiment in FIG. 2 and its accompanying graphically illustrated operative characteristics is less than one-half miscrosecond. The relatively short conductively pulsed period within the light source of the present invention, together with a pulse repetition rate as typified by the thirty pulse per second rate employed in operation of the embodiment illustrated in FIG. 2, assures a low duty cycle which, in turn, enables extremely high peak power outputs from the light source.

In typical operation of an embodiment of the present invention as outlined hereinbefore the duty cycle was approximately of the order $2 \times 10^{-5}$ which facilitates the attainment of comparatively extremely high peak power output levels. It will appreciated by those knowledgeable and skilled in the pertinent arts that this advantage is afforded by providing for pulsed, rather than CW operation. Further, it will be readily recognized that operation in a CW mode at the extremely high peak power level obtainable within the concept of the present invention would result in disintegration and destruction of the same lamp structure.

Figure 5:
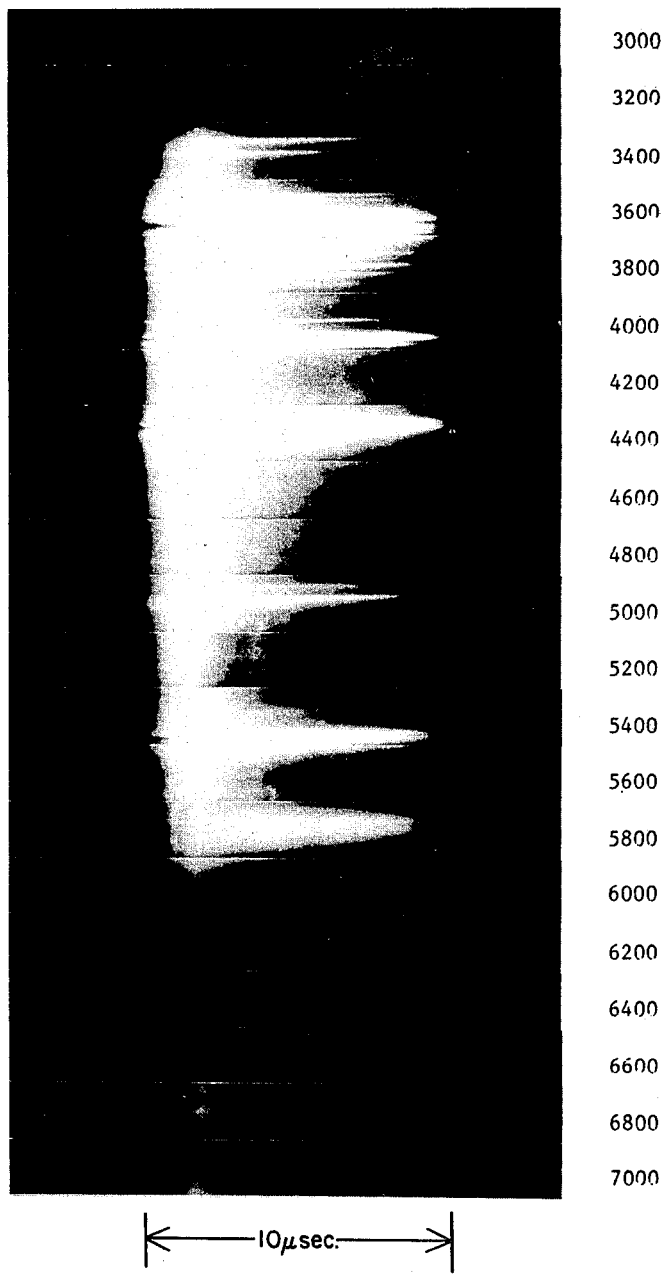
FIG. 5 is the streak-photo recording of a light source of the present invention operative at approximately 600° C.
Figure 6:
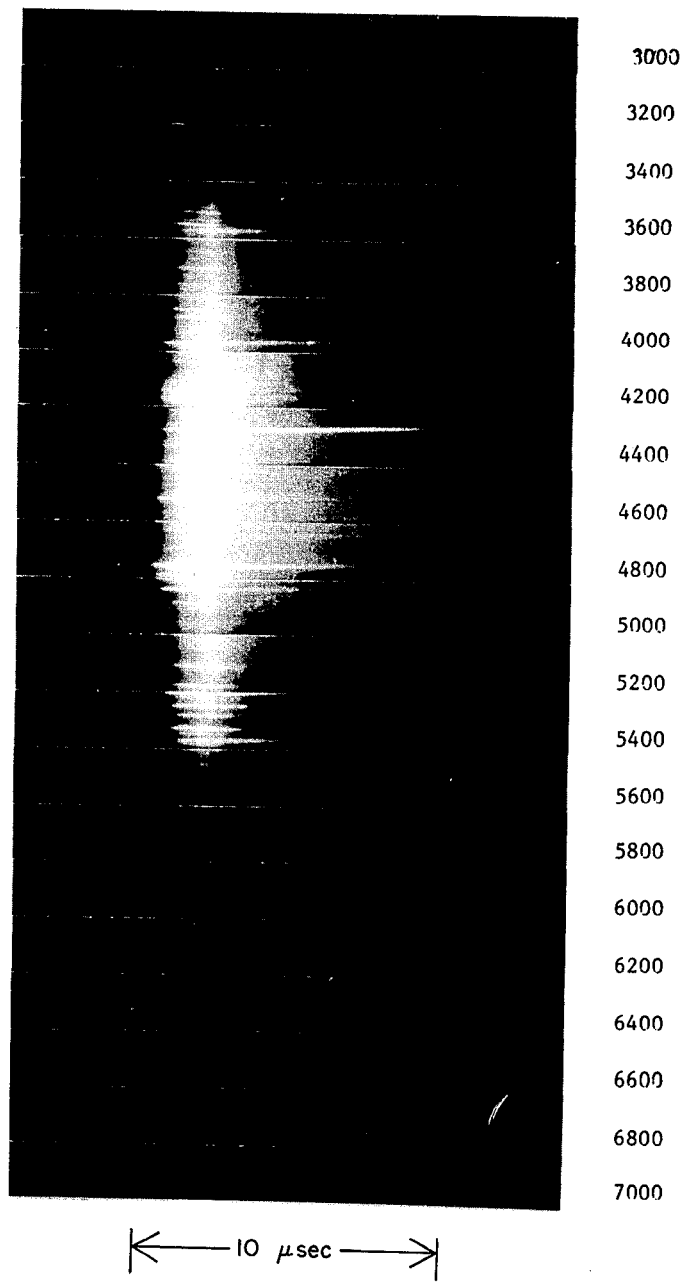
FIG. 6 is the streak-photo recordings of the same lamp operative at a temperature of approximately 200° C.

FIGS. 5 and 6 are photographic recordings of actual operation of a preferred embodiment of the present invention such as that illustrated in FIG. 2. The photographic recordings of FIGS. 5 and 6 were made with a commercially available image converter camera employed in a high speed streak-photo mode to record spectral distribution vs. time as the light source was pulsed in actual operation. A commercially available one-half meter scanning spectrometer was used to obtain the time resolved spectra of the pulsed light source.

FIG. 5 confirms that a principal amount of light energy output from the high intensity pulse light source of the present invention was produced within the desired 3600A–4300A spectral region.

Those knowledgeable and skilled in the pertinent art will appreciate that it is difficult, if not impossible, to predict a priori the exact or even the approximate nature of the spectral emission to be realized from a high pressure plused arc since the emission and absorption processes in a non-homogeneous plasma, as well as the magnitude of the continuum radiation (free-free and free-bound transitions) are functions of electron density, electron temperature, and population density of the energy state. These latter variables, however, are independent from the time of pulsed initiation to the time that thermal dynamic equilibrium is established. Each of the photographic records of FIGS. 5 and 6 is a composite of twenty-one individual streak-photos, 200A in spectral width, throughout the vertical wavelength scale as shown. The spectral intensity is indicated by the degree of film exposure. However, the information of such photo records is only semiquantative in nature due principally to the non-linearity of the exposure density characteristic of the film. Nonetheless the photo records of FIGS. 5 and 6 serve to confirm the importance of several aspects which inher in the concept of the present invention.

Accordingly, the photographic records of FIGS. 5 and 6 confirm inherent aspects of the concept of the present invention, including a requisite elevated temperature to develop sufficient vapor pressures of both the xenon gas and the vaporized metallic mercury to produce the desired spectral emission within the 3600A to 4300A region.

FIG. 6 illustrates and confirms that the same light source, when operated at a temperature of approximately 200° C does not have the potential of producing high intensity light energy outputs within the desired spectral range due probably to the fact that sufficiently high vapor pressures within the sealed envelope are not developed.

By contrast, the photographic record illustrated in FIG. 5 with the same lamp operating at a temperature of the order of 500°–650° C confirms the highly desirable spectral output within the 3600–4300A range as shown by the spectral distribution realized in actual operation illustrated in FIG. 3

Moverover, it is important to appreciate that the actual duration of the current pulse carried by a light source of the present invention is significantly less than one microsecond, though the emitted light energy within the desired wavelength region is of considerably longer duration of the order of ten microseconds as shown most clearly in the photographic record of FIG. 5.

Those knowledgeable and skilled in the pertinent arts who are aware of the most recent developments of light energy sources particularly suited to underwater systems use, such as the "New Improved Dye for the Blue-Green Spectrum Region" reported by E. J. Schimitschek, J. A. Trias, M. Taylor and J. E. Celto in the IEEE Journal of Quantum Electronics, QE-9781 (July 1973), will readily appreciate the highly desirable advantages of the present invention. Increased peak power output and generation of a principal portion of light energy output matched to the spectral region of the absorption band of new improved dye laser materials significantly enhances the efficiency of underwater systems by providing a more efficacious source of laser excitation.

Obviously many modifications and variations of the present invention are possible in the light of the above teachings. It is therefore to be understood that within the scope of the appended claims the invention may be practiced otherwise than as specifically described.

What is claimed is:

1. A high intensity pulsed light source producing its principal light energy output substantially within the 3600A to 4300A spectral region comprising:
    a sealed envelope of material substantially transparent to light energy within said spectral region;
    electrically conductive electrodes communicating with the interior of said envelope, forming a gap therebetween and having external terminals;
    xenon gas contained within said envelope in an amount sufficient to produce at least one atomosphere of pressure in its unheated state;
    mercury contained within said envelope in an amount sufficient to develop a vapor pressure of not less than one atmosphere upon said envelope being heated to its operative temperature; and
    a source of pulsed electrical power connected to said terminals and operative at a duty cycle of the order of $2 \times 10^{-5}$ with a pulse rise time of substantially less than one-half microsecond for producing repetitive current flow through said gap having a minimum peak amplitude of 3000 amperes, and maintaining said envelope and its contents at an operative temperature of not less than 500°C.

2. A high intensity pulsed light source as claimed in claim 1 wherein the dimension of the gap between said electrically conductive electrodes is substantially matched to the principal dimension of a dye laser material which it excites by optical coupling.

3. A high intensity pulsed light source as claimed in claim 1 wherein said source of pulsed electrical power includes a d.c. power source to aid in initiation of conduction in the gap between said electrodes.

* * * * *